United States Patent
Trollmann et al.

(10) Patent No.: US 12,411,242 B2
(45) Date of Patent: Sep. 9, 2025

(54) THREE-DIMENSIONAL (3D) SCANNER WITH 3D APERTURE AND TILTED OPTICAL BANDPASS FILTER

(71) Applicant: FARO Technologies, Inc., Lake Mary, FL (US)

(72) Inventors: Jens Trollmann, Ludwigsburg (DE); Stefan Müller, Ditzingen (DE); Martin Ossig, Tamm (DE); Elisabeth Brühl, Tamm (DE)

(73) Assignee: FARO Technologies, Inc., Lake Mary, FL (US)

( * ) Notice: Subject to any disclaimer, the term of this patent is extended or adjusted under 35 U.S.C. 154(b) by 1161 days.

(21) Appl. No.: 17/314,613

(22) Filed: May 7, 2021

(65) Prior Publication Data
US 2021/0373166 A1  Dec. 2, 2021

Related U.S. Application Data

(60) Provisional application No. 63/031,208, filed on May 28, 2020.

(51) Int. Cl.
G01S 17/894 (2020.01)
G01S 7/481 (2006.01)

(52) U.S. Cl.
CPC .......... G01S 17/894 (2020.01); G01S 7/4811 (2013.01); G01S 7/4817 (2013.01)

(58) Field of Classification Search
CPC ......... G01S 17/894; G01S 17/42; G01S 7/497
See application file for complete search history.

(56) References Cited

U.S. PATENT DOCUMENTS

| | | | |
|---|---|---|---|
| 5,221,956 A * | 6/1993 | Patterson | G01S 7/481 356/28 |
| 5,227,859 A * | 7/1993 | Leib | G02B 5/32 250/226 |
| 7,430,068 B2 | 9/2008 | Becker et al. | |
| 7,733,544 B2 | 6/2010 | Becker et al. | |
| 8,384,914 B2 | 2/2013 | Becker et al. | |
| 8,625,106 B2 | 1/2014 | Ossig et al. | |
| 8,705,016 B2 | 4/2014 | Schumann et al. | |
| 8,719,474 B2 | 5/2014 | Ossig et al. | |
| 9,074,878 B2 | 7/2015 | Steffey et al. | |
| 9,074,883 B2 | 7/2015 | Schumann et al. | |
| 9,113,023 B2 | 8/2015 | Bridges et al. | |
| 9,210,288 B2 | 12/2015 | Bridges et al. | |
| 9,279,662 B2 | 3/2016 | Steffey et al. | |
| 9,372,265 B2 | 6/2016 | Zweigle et al. | |
| 9,513,107 B2 | 12/2016 | Zweigle et al. | |
| 9,551,575 B2 | 1/2017 | Bridges et al. | |

(Continued)

*Primary Examiner* — Isam A Alsomiri
*Assistant Examiner* — Joseph C Fritchman
(74) *Attorney, Agent, or Firm* — McCarter & English, LLP; Dave S. Christensen; Joseph C. Drish

(57) ABSTRACT

A three-dimensional (3D) scanner includes a light source, an optical detector, a reference reflector, and a 3D aperture structure having side walls and an aperture, the aperture sized to pass a first portion of the light reflected by the reference reflector, the side walls sized to block a second portion of the light reflected by the reference reflector. The 3D scanner further includes a tilted optical bandpass filter to block ambient background light without creating cavity reflections that might cause errors in measured distance.

10 Claims, 10 Drawing Sheets

(56) References Cited

U.S. PATENT DOCUMENTS

| | | | |
|---|---|---|---|
| 9,618,620 B2 | 4/2017 | Zweigle et al. | |
| 9,689,986 B2 | 6/2017 | Kramer et al. | |
| 10,132,611 B2 | 11/2018 | Steffey et al. | |
| 2011/0019188 A1* | 1/2011 | Ray | B64D 15/20 356/342 |
| 2012/0262698 A1* | 10/2012 | Day | G01S 17/42 356/614 |
| 2013/0321921 A1* | 12/2013 | Belgum | G02B 7/005 359/578 |
| 2015/0109419 A1* | 4/2015 | Vollrath | G01C 11/025 348/47 |
| 2018/0167602 A1* | 6/2018 | Pacala | G02B 5/208 |
| 2020/0209448 A1* | 7/2020 | Rowlands | C23C 28/42 |
| 2021/0172851 A1* | 6/2021 | Lincoln | G01S 7/4812 |
| 2021/0333454 A1* | 10/2021 | Ockenfuss | G06V 10/143 |

\* cited by examiner

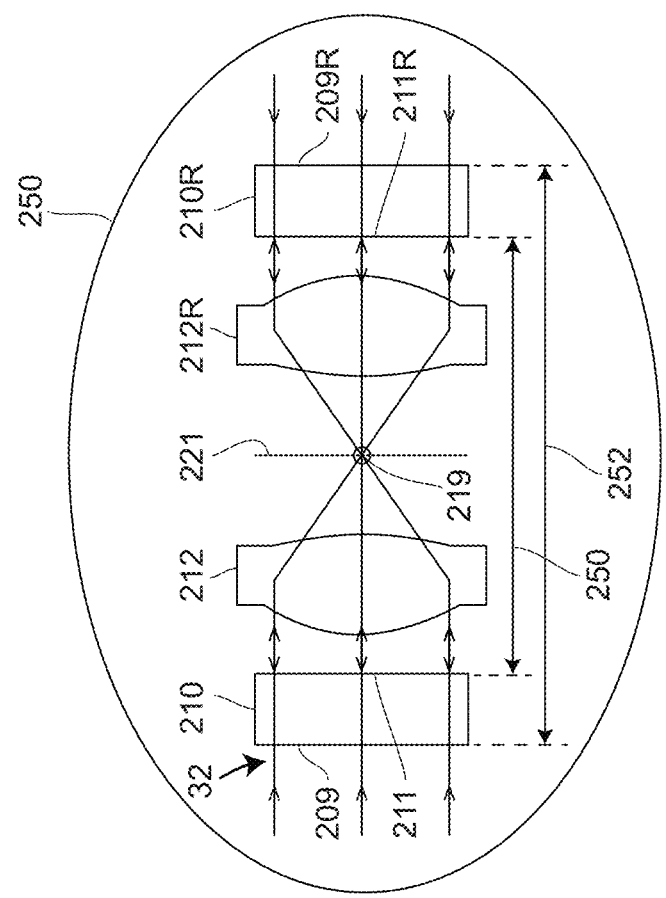
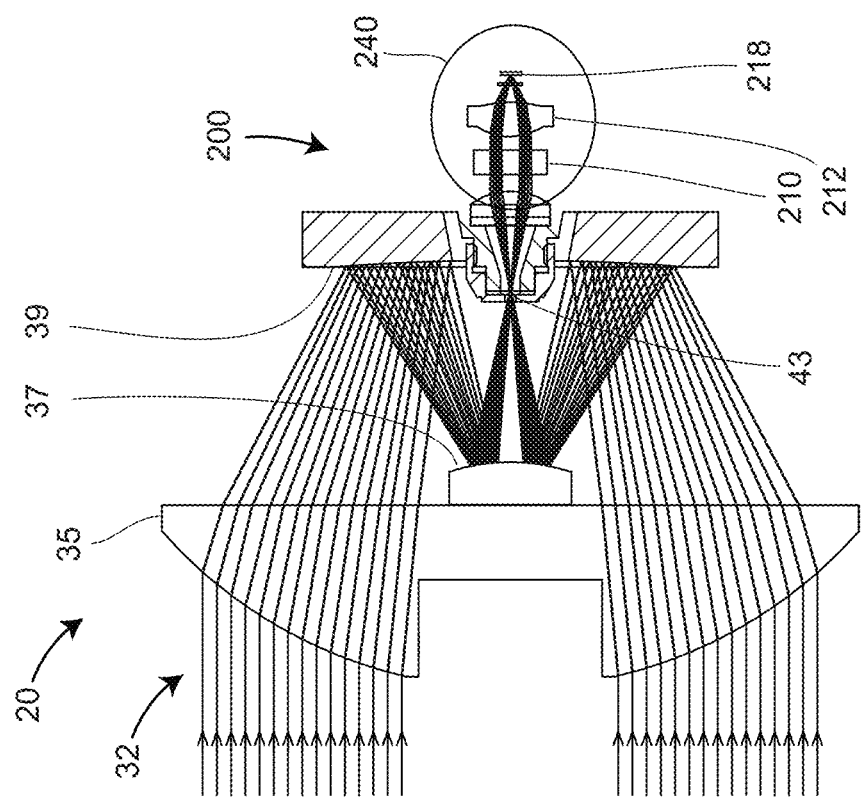
FIG. 8B
FIG. 8A

THREE-DIMENSIONAL (3D) SCANNER WITH 3D APERTURE AND TILTED OPTICAL BANDPASS FILTER

CROSS REFERENCE TO RELATED APPLICATIONS

This application claims the benefit of U.S. Provisional Application Ser. No. 63/031,208, filed May 28, 2020, the entire disclosure of which is incorporated herein by reference.

BACKGROUND

The subject matter disclosed herein relates to use of a three-dimensional (3D) laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of 3D points on an object within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. Some beam steering mechanisms include a first motor that steers the beam of light about a first axis by a first angle that is measured by a first angular encoder (or other angle transducer). Some beam steering mechanisms further include a second motor that steers the beam of light about a second axis by a second angle that is measured by a second angular encoder (or other angle transducer). In some embodiments, a first motor rotates a rotary mirror relatively rapidly about a horizontal axis while a second motor drives most of the scanner assembly, including the rotary mirror, to rotate about a vertical axis.

A 3D image of a scene may require multiple scans from different registration positions. Such registration is performed by matching targets in overlapping regions of the multiple scans. The targets may be artificial targets such as spheres or checkerboards or they may be natural features such as corners or edges of walls.

Some TOF laser scanners periodically measure a reference distance to a reference reflector. By correcting measured distances to account for observed changes in the measured reference distance, common-mode errors can be removed. Such common-mode errors may result, for example, from changes in ambient temperature or from electrical drift. In some cases, however, unwanted signals from the reference reflector may corrupt the measurement of the reference distance resulting in a reduced accuracy of 3D coordinates measured by the laser scanner. It is desired to reduce the unwanted signals from the reference reflector.

Some TOF laser scanners are used in sunlight or in the presence of other bright background light. Such bright light may, in some cases, cause errors in measured 3D coordinates. To get around this problem, a filter having a narrow passband may be placed in front of the optical detector in the distance meter, permitting only the laser light to pass. A difficulty that may be encountered in using such a filter, however, is that the reflections from the bandpass filter and a reflecting surface of the optical detector may act as an etalon, resulting in multiple reflections of the returning laser light before the light passes into the optical detector. These multiple reflections cause the average distance traveled by the light to increase, resulting in errors in the measured distance. It is desired needed to eliminate the unwanted reflections.

Accordingly, while existing 3D scanners are suitable for their intended purposes the need for improvement remains, particularly in providing a 3D scanner having certain features of embodiments disclosed herein.

BRIEF DESCRIPTION

According to one aspect of the disclosure, a three-dimensional (3D) scanner comprises: a light source; an optical detector; a reference reflector operable to reflect light from the light source; and a 3D aperture structure having side walls and an aperture, the aperture sized to pass a first portion of the light reflected by the reference reflector, the side walls sized to block a second portion of the light reflected by the reference reflector.

In addition to one or more of the features described herein, or as an alternative, further embodiments of the scanner may include a beam steering mechanism operable to steer the light from the light source. In addition to one or more of the features described herein, or as an alternative, further embodiments of the scanner may include a processor operable to determine a reference distance based at least in part on the first portion of light received by the optical detector. In addition to one or more of the features described herein, or as an alternative, further embodiments of the scanner may include the processor being further operable to determine a distance to a first point on an object based at least in part on light from first point received by the optical detector.

In addition to one or more of the features described herein, or as an alternative, further embodiments of the scanner may include the determined distance being a reference distance determined by the processor based at least in part on the first portion of light received by the optical detector. In addition to one or more of the features described herein, or as an alternative, further embodiments of the scanner may include the beam steering mechanism being a rotary mirror.

In addition to one or more of the features described herein, or as an alternative, further embodiments of the scanner may include the 3D aperture structure having a front surface, the side wall extending between from the front surface to a front surface of the aperture. In addition to one or more of the features described herein, or as an alternative, further embodiments of the scanner may include the side wall defining a conically shaped opening between the front surface of the 3D aperture structure and a front surface of the aperture. In addition to one or more of the features described herein, or as an alternative, further embodiments of the scanner may include a diameter of the conically shaped opening adjacent the front surface of the 3D aperture structure being larger than the diameter adjacent the aperture. In addition to one or more of the features described herein, or as an alternative, further embodiments of the scanner may include the 3D aperture structure being operably coupled to the optical detector.

In a further aspect of the disclosure, a three-dimensional (3D) scanner comprises: a light source operable send first light onto an object; an optical bandpass filter having a tilt angle; an optical detector having an active area, the optical detector receiving a second light, the second light being a portion of the first light, the optical detector reflecting a third light onto the optical bandpass filter, the third light being a portion of the second light, the optical bandpass filter reflecting a fourth light, the fourth light being a portion of the third light, wherein the tilt angle of the optical bandpass filter is selected to reflect the fourth light off the active area.

In addition to one or more of the features described herein, or as an alternative, further embodiments of the scanner may include the optical bandpass filter having a dielectric coating selected based at least in part on the tilt angle.

In addition to one or more of the features described herein, or as an alternative, further embodiments of the scanner may include the active area having a photodiode or a photodetector. In addition to one or more of the features described herein, or as an alternative, further embodiments of the scanner may include a focusing lens disposed between the optical bandpass filter and the active area. In addition to one or more of the features described herein, or as an alternative, further embodiments of the scanner may include the tilt angle being 5 degrees.

In addition to one or more of the features described herein, or as an alternative, further embodiments of the scanner may include a reference reflector operable to reflect light from the light source and a 3D aperture structure having a side wall and an aperture. The aperture sized to pass a first portion of the light reflected by the reference reflector, the side wall sized to block a second portion of the light reflected by the reference reflector.

In addition to one or more of the features described herein, or as an alternative, further embodiments of the scanner may include the 3D aperture structure having a front surface, the side wall extending between from the front surface to a front surface of the aperture. In addition to one or more of the features described herein, or as an alternative, further embodiments of the scanner may include the side wall defining a conically shaped opening between the front surface of the 3D aperture structure and a front surface of the aperture. In addition to one or more of the features described herein, or as an alternative, further embodiments of the scanner may include a diameter of the conically shaped opening adjacent the front surface of the 3D aperture structure being larger than the diameter adjacent the aperture. In addition to one or more of the features described herein, or as an alternative, further embodiments of the scanner may include the 3D aperture structure is operably coupled to the optical detector.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 8A, 8B are cross-sectional and schematic views, respectively, of a geometry that supports cavity reflections according to an embodiment;

The detailed description explains embodiments of the invention, together with advantages and features, by way of example with reference to the drawings.

DETAILED DESCRIPTION OF THE INVENTION

Embodiments herein relate to a TOF scanner that improves distance accuracy by reducing spurious reference reflections from a reference reflector. Embodiments herein further relate to a TOF scanner that improves distance accuracy by eliminating cavity reflections.

Figure 1:
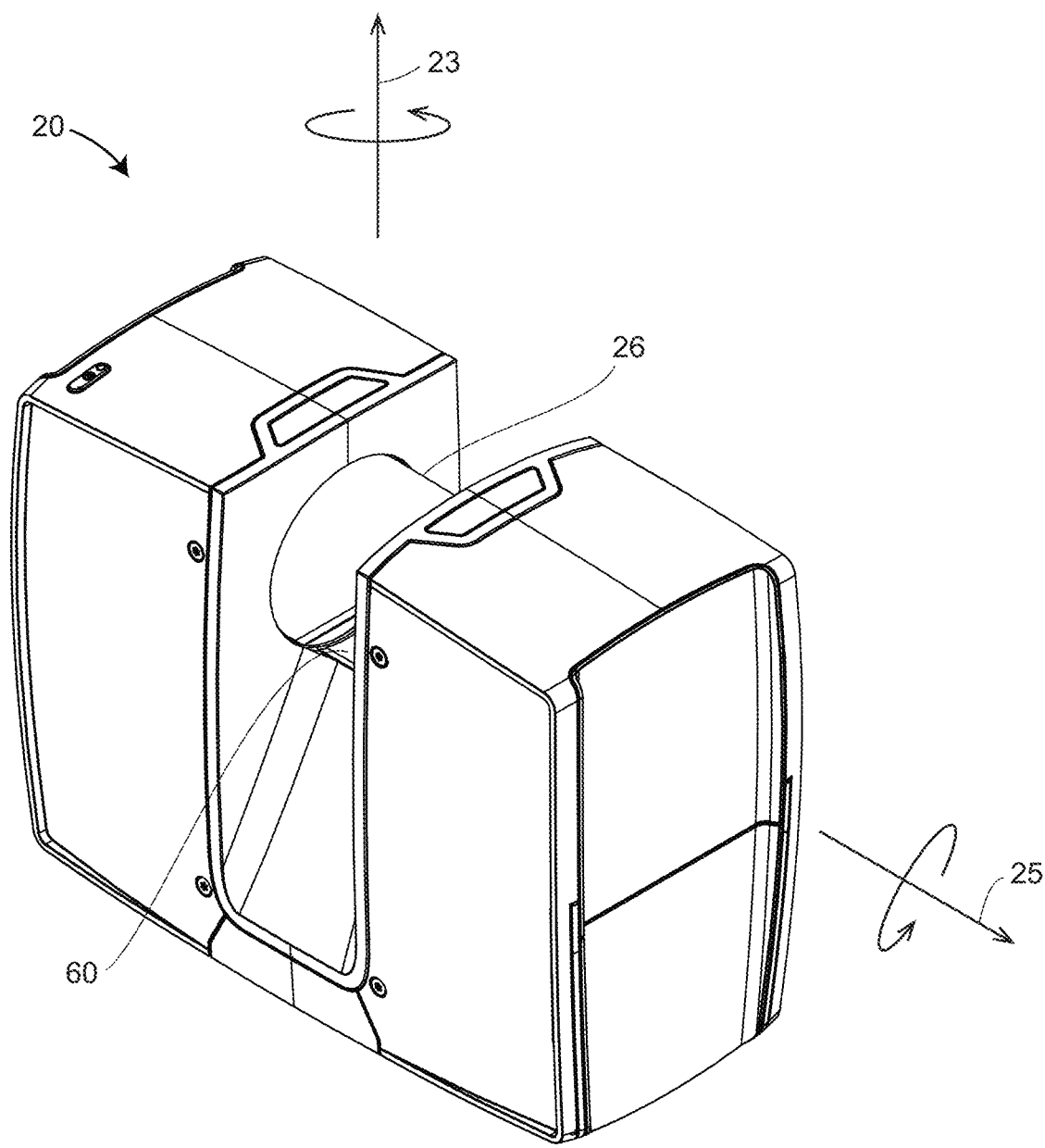
FIG. 1 is a perspective view of a laser scanner in accordance with an embodiment.
Figure 2:
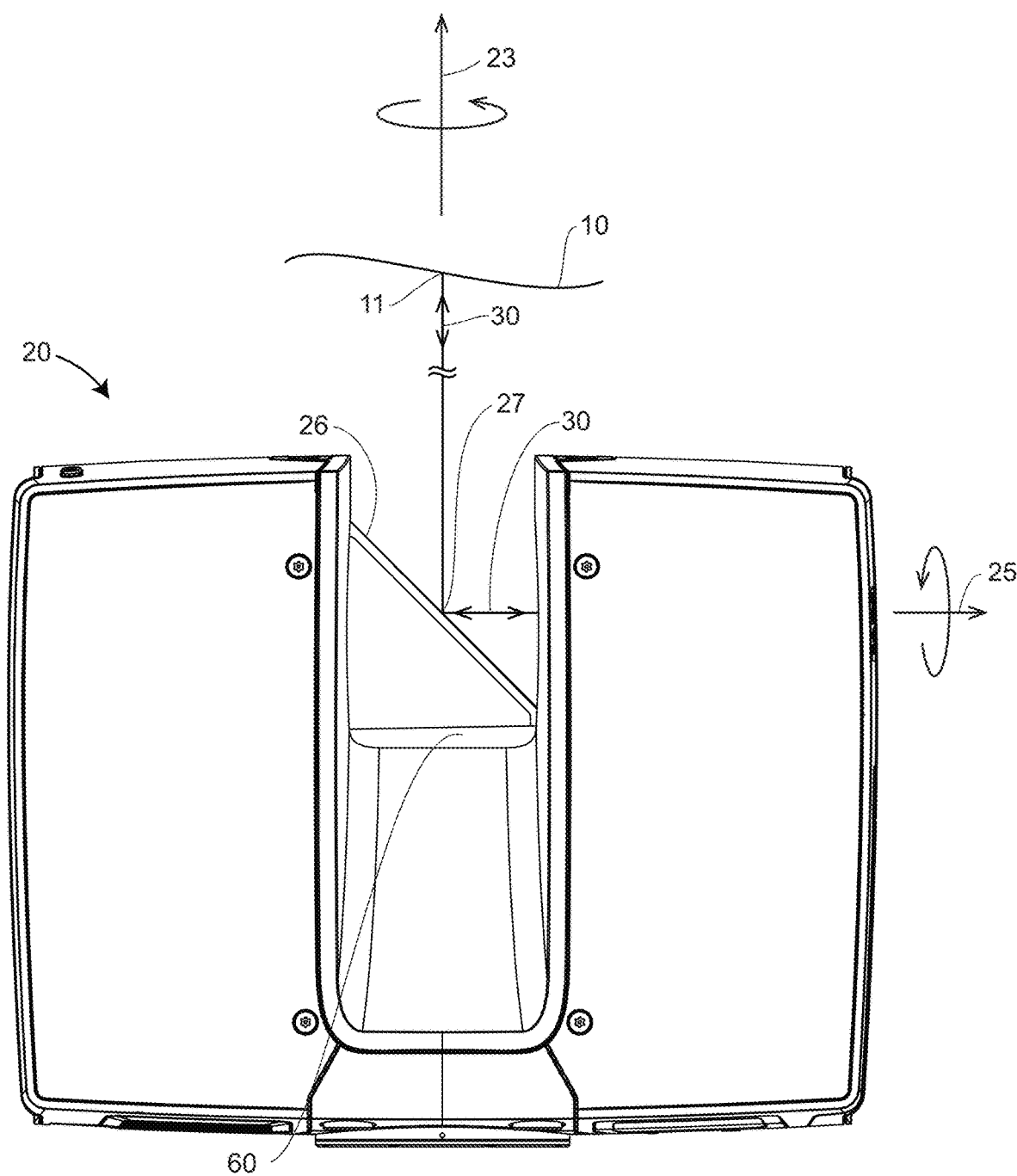
FIG. 2 is a side view of the laser scanner illustrating a method of measurement of points on an object in accordance with an embodiment.

FIGS. 1-2 show a laser scanner 20 that optically scans and measures a point 11 on an object 10 of an object in an environment surrounding the laser scanner 20. In an embodiment, the laser scanner 20 rotates about a vertical axis 23. The laser scanner 20 has a gimbal point 27 that is a center of rotation about the vertical axis 23 and a horizontal axis 25. The scanner 20 has a rotary mirror 26, which is rotated about the horizontal axis 25. Here, the terms vertical axis and horizontal axis refer to the scanner in its normal upright position, but the scanner may also operate correctly when tilted on its side or turned upside down. The term pan axis or standing axis may be used as an alternative to vertical axis. The combination of the motor (not shown) that drives the rotary mirror 26 about the horizontal axis 25, the motor (not shown) that drives most of the rest of the scanner assembly 20 about the vertical axis 23, and the vertical and horizontal angle transducers (not shown) are part of a beam-steering system. In other scanners, other types of beam-steering systems are used.

The scanner 20 is further provided with a light source 29 that emits a light beam 30. In an embodiment, the light beam 30 is a coherent light beam such as a laser beam. In an embodiment, the light beam has a wavelength range between 300 to 1600 nanometers (nm). In an embodiment, the light beam 30 is amplitude modulated or intensity modulated, for example, with a sinusoidal waveform or a rectangular waveform. In other embodiments, other types of modulation are used. In other embodiments, non-laser light sources such as superluminescent diodes are used.

The light beam 30 is emitted by the light source 29 onto the rotary mirror 26, which deflects it into the environment. The object 10 reflects the light beam 30 back onto the rotary mirror 26. The direction of the light beam 30 at a given time depends on the angular position of the rotary mirror 26 about the axis 23 and the axis 25. Motors (not shown) are used to turn the laser scanner 20 about the vertical axis 23 and the rotary mirror 26 about the horizontal axis 25. Angular transducers such as angular encoders (not shown) measure the horizontal rotation angle of the rotary mirror 26 about the horizontal axis 25 and the vertical rotation angle of the scanner 20 about the vertical axis 23.

Figure 3:
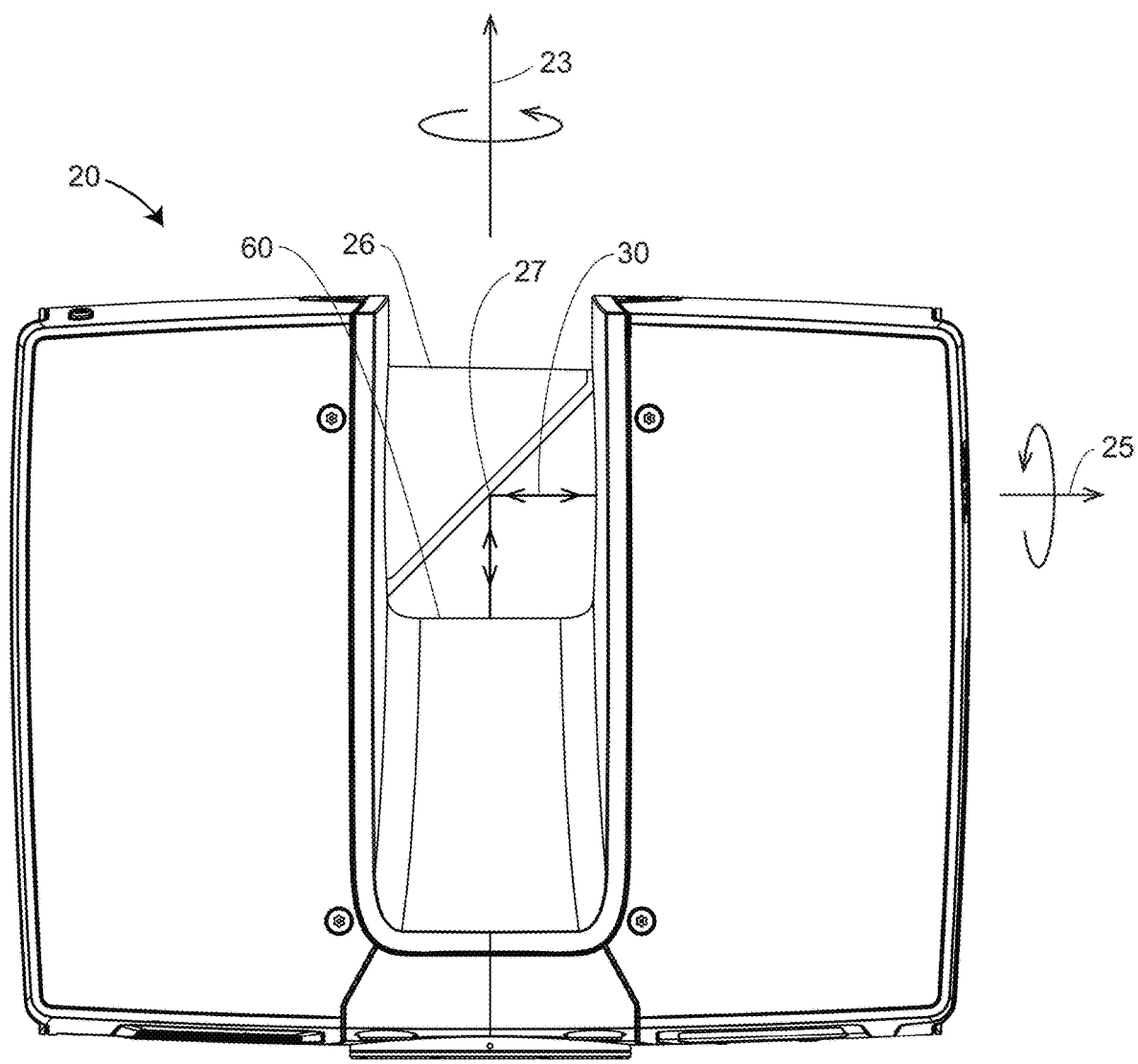
FIG. 3 is a side view of the laser scanner illustrating measurement of distance to a reference reflector according to an embodiment.

In an embodiment shown in FIG. 3, once each rotation, the rotary mirror 26 directs light beam 30 downward to reflect off a reference reflector 60. The light reflected off the reference reflector 60 is referred to as "reference light." This reference light is used to establish a reference distance of the light beam 30 emitted from the scanner 20, traveling to reference reflector 60, and then traveling to an optical detector after re-entering the scanner 20. Such measurement allows for changes in the scanner system, which may occur, for example, because of changes in ambient temperature.

Figure 4:
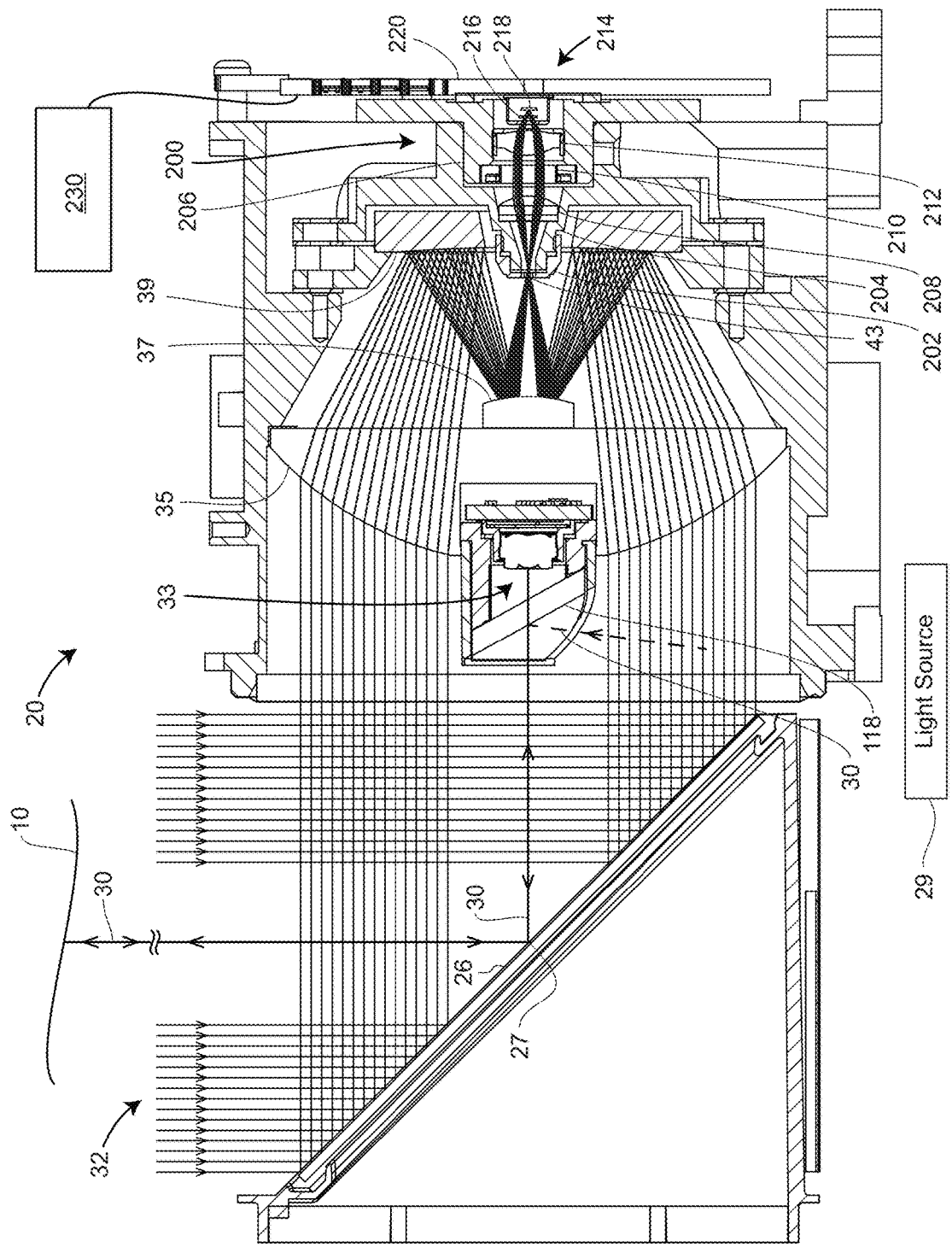
FIG. 4 is a cross-sectional view of a portion of the laser scanner, illustrating schematically the outgoing and return path of the laser light according to an embodiment.

FIG. 4 is a cross-sectional view of a portion of the laser scanner 20. In an embodiment, a laser light source 29 emits light beam 30 at a wavelength of 1550 nm. In other embodiments, different wavelengths or additional wavelengths are emitted. In an embodiment, the laser light beam 30 is sent to a dichroic beam-splitter 118 that reflects the light beam 30 to the gimbal point 27 of the rotary mirror 26. The laser light beam 30 travels to the object 10, where it is reflected (scattered) off a point 11 of the object 10 and returned to the rotary mirror 26 as a broad beam of returning light 32. Most of the broad beam of returning light 32 reflects off the rotary mirror 26 and enters a collecting lens 35. A small portion of the returning light 32 reflects off the dichroic beam splitter 118 and is lost. Background colored light passes through the dichroic beam splitter and is imaged by a central color camera 33. By periodically taking color photographs of the surroundings, the images obtained by the central color camera 33 enable the 3D coordinates obtained by the scanner 20 to be colorized. An advantage of the central color camera 33 is that parallax error between the 3D and color data is reduced or minimized.

The broad beam of returning light 32 is refracted by the collecting lens 35, reflected off a concave reflector or mirror 39, and reflected off a convex reflector or mirror 37. The light then converges to a relatively small spot 43 before entering a receiver assembly 200. In an embodiment, the receiver assembly 200 includes an aperture cap 202, a first holding structure 204, a second holding structure 206, a collimating lens 208, an optical bandpass filter 210, a focusing lens 212 and an optical detector 214. In an embodiment, the optical detector 214 includes a cover glass 216 and a photodetector or photodiode detector 218 (i.e. the active area). In an embodiment, the photodiode 218 is an avalanche photodiode (APD) affixed to a circuit board 220. In other embodiments, other types of optical detectors may be used. The term optical detector as applied to the optical detector 214 refers to an optical detector assembly that includes an active optical detector element as well as a package and cover glass (if present) around the active optical detector. In the present document, the term photodetector is used to refer to an active optical element within a detector package. However, the term photodetector is used herein for convenience and may refer to any type of optical detector, which might be a photomultiplier tube, for example. Each optical detector includes an active area that, when illuminated by light of an appropriate wavelength, produces an electrical signal in response.

The receiver assembly 200 further includes a processor system 230 having one or more processors. In an embodiment, the aperture cap 202 is screwed onto threads on the first holding structure 204, and the collimating lens 208 and focusing lens 212 are affixed to the second holding structure 206. The processor system 230 may be a single processing element or multiple processing elements. It may include complete computer systems of individual electrical components such as microprocessors, memory elements, field programmable gate arrays (FPGAs), digital signal processors (DSPs), or other electrical components having processing capability. The one or more processing elements may be local to the scanner 20, or they may be an external computer either located locally or remotely (i.e., networked). The processor system 230 processes signal information obtained from the optical detector 214 to determine a distance to the object 10 being measured and to combine the determined distance with the vertical angle and the horizontal angle measured by the angular encoders to determine 3D coordinates to objects 10 within the environment of the scanner. In an embodiment, the scanner 20 may be moved to different locations within the environment and the 3D coordinates obtained by the scanner at each of those locations registered together to obtain a combined set of 3D coordinates. In an embodiment, the processor system 230 provides these registered 3D coordinates. In some cases, post processing of the collected 3D coordinates may be performed at a later time, such as by other computing systems for example.

The speed of light in air depends on the properties of the air such as the air temperature, barometric pressure, relative humidity, and concentration of carbon dioxide. Such air properties influence the index of refraction n of the air. The speed of light in air $c_{air}$ is equal to the speed of light in vacuum c divided by the index of refraction. In other words, $c_{air} = c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

Figure 5:
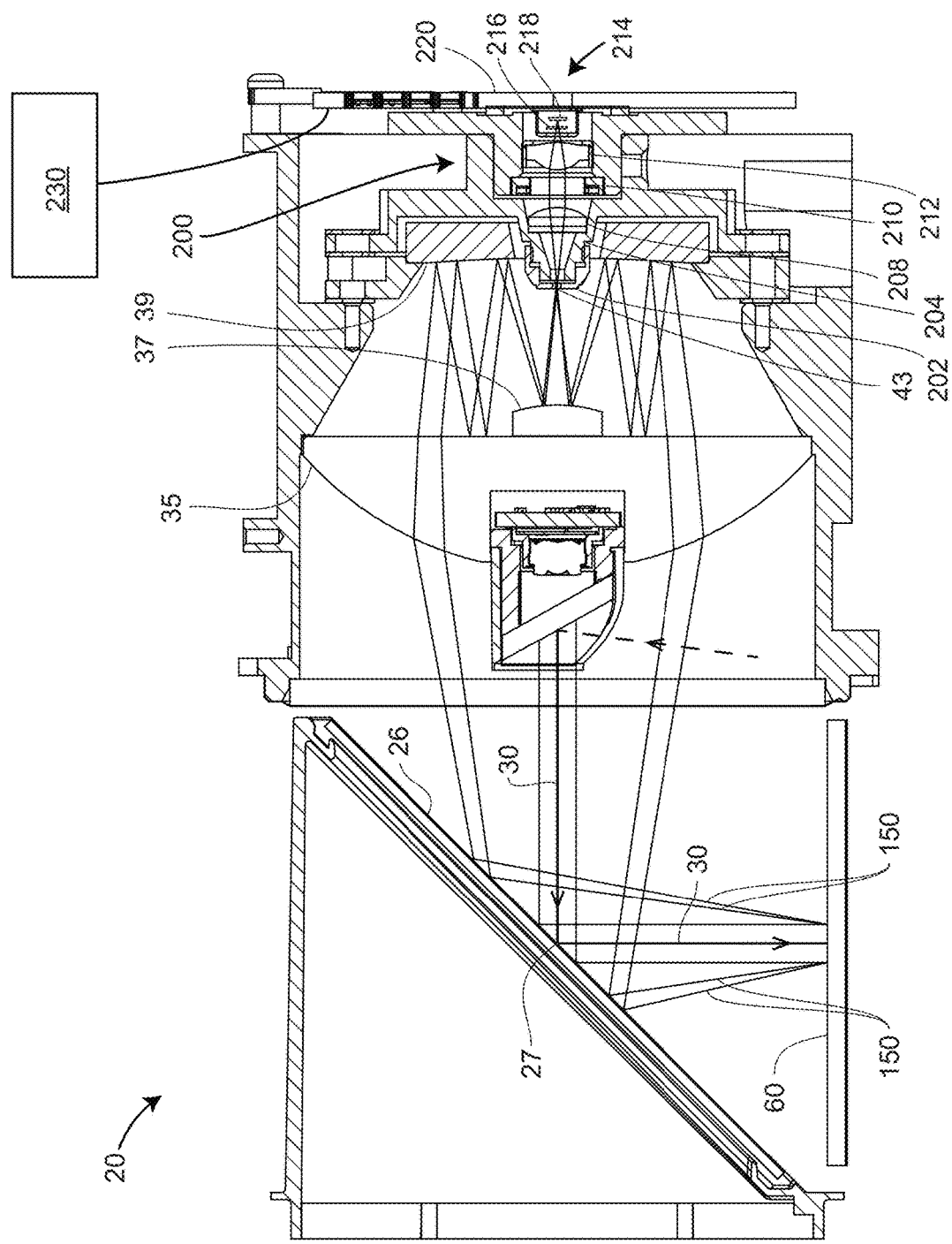
FIG. 5 is a cross-sectional view of a portion of the laser scanner illustrating schematically the path of laser light reflected off the reference reflector before travelling to an optical detector according to an embodiment.

FIG. 5 is a cross-sectional view of a portion of the laser scanner 20 showing the path of the beam of light 30 reflected off the reference reflector 60 as an expanding beam of light 150. In an embodiment, the reference reflector 60 includes an upper layer of a smoothly reflecting material such as a smoothly reflecting aluminum foil. In an embodiment, such a smoothly reflecting material scatters light in a manner described by a Harvey-Shack scattering function, resulting in an expanding beam of light as in the beam of light 150.

The light 150 is refracted by the collecting lens 35, reflected by the concave mirror 39 and the convex mirror 37 to form a relatively small spot 43 at the entrance to the receiver assembly 200. The light passes into the receiver assembly 200, arriving the optical detector 214. The purpose of reflecting light 150 off the reference reflector 60 at each revolution of the rotary mirror 26 is to provide a baseline reference distance for the scanner, which may change as a result of changes in temperature, electrical drift, or other effects. In an embodiment, the measured baseline reference distance is subtracted from each of the distances measured by the scanner 20 to object points 11 and to this result an R0 (R-zero) compensation value is added. These mathematical operations ensure that points measured by the scanner 20 are referenced to a point fixed in space (the gimbal point 27) even as the scanner 20 rotates about the axis 23 and the rotary mirror 26 rotates about the axis 25.

Figure 6:
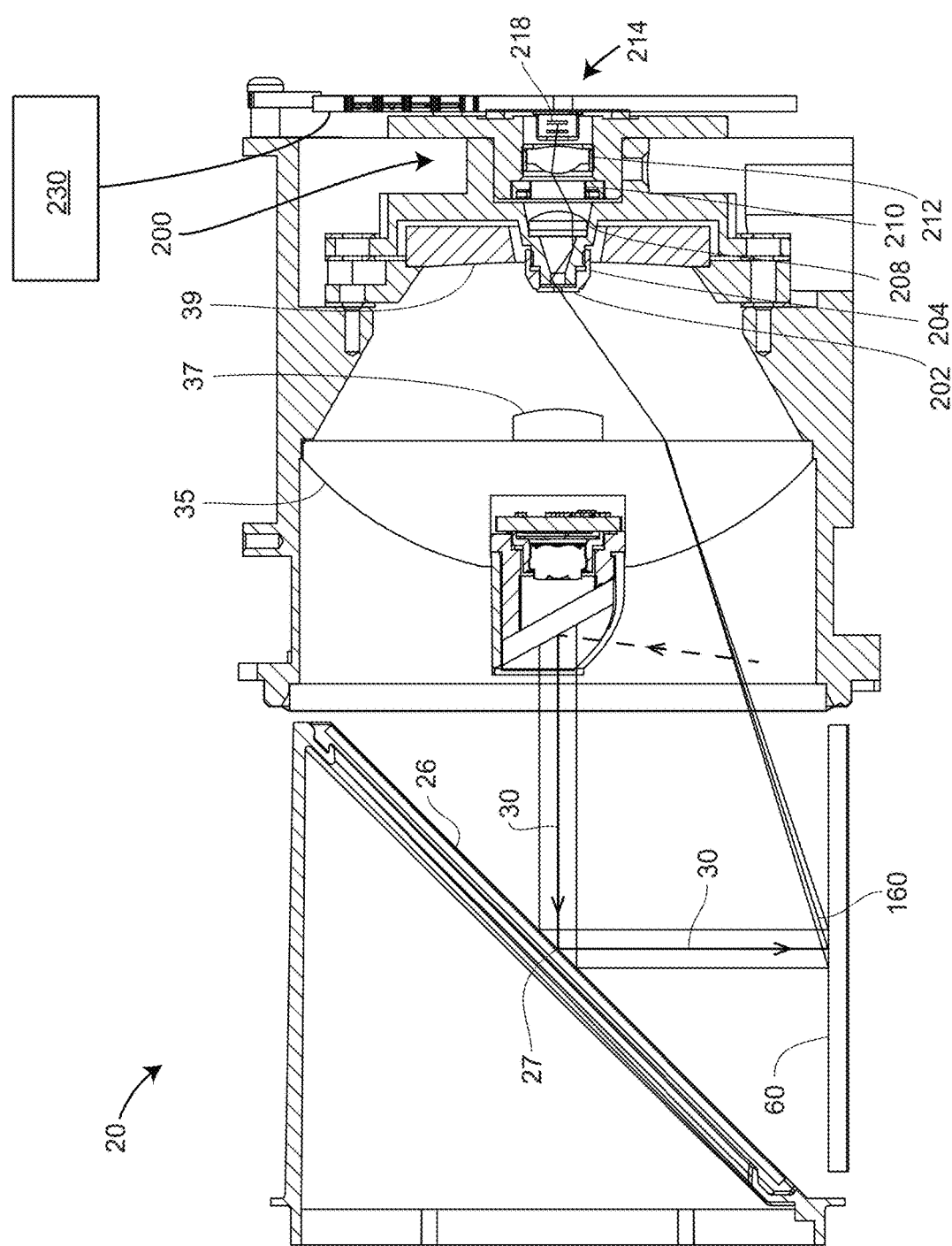
FIG. 6 is a cross-sectional view of a portion of the laser scanner illustrating an undesired path of reflection for laser light reflected (scattered) off the reference reflector according to an embodiment.

FIG. 6 is a cross-sectional view of a portion of the laser scanner 20, showing the path of a beam of light that reflects off the reference reflector 60 to form a scattered beam of light 160, refracts through the collecting lens 35, and travels directly to the receiver assembly 200, bypassing reflections off the convex mirror 37 and the concave mirror 39. The term "reflects" as used in this instance refers to reflection by scattering event on the surface of reference reflector. This type of reflection, which may spread over a relatively broad angle, may be distinguished from a specular reflection in which the angle of reflection of reflected rays of light have an angle of reflection equal to (or very nearly equal to) a corresponding angle of incidence. In an embodiment, the scattered light cannot pass directly through the center of the aperture cap 202, but instead bounces off inner portions of the aperture in the aperture cap 202 and the opening in the first holding structure 204. The scattered beam of light 160 then passes through the collimating lens 208, the optical bandpass filter 210, and the focusing lens 212 to arrive at the photodetector 218 of the optical detector 214. The scattered beam of light 160 that arrives at the photodetector 218 is not the reference light 150 that provides the desired baseline reference distance but instead is a spurious reflection that contaminates the reference light 150, thereby causing an error in the determined baseline distance reference.

In an embodiment, the distance meter in the scanner 20 is a phase-based TOF distance meter. In an embodiment, the laser light is intensity modulated with a sinusoidal wave or square wave at a plurality of frequencies. Laser light reflected off the object 10 is picked up by the optical detector 214 and analyzed by the processor system 230 to determine phase shifts in the plurality of modulated frequencies. The processor uses these measured phase shifts to determine the distance to the object 10. This distance is compared to the determined baseline distance reference to obtain the measured distance, which is ordinarily a distance taken in reference to the gimbal point 27 of the scanner 20. The baseline reference distance determined by measuring the distance traveled by the reference light 150 is sensitively affected by contamination from spurious reflections such as those originating from the scattered light 160. In other embodiments, the distance meter is not a phase-based TOF distance meter but uses a different method for determining the distance to the object 10. In an embodiment, the distance meter modulates the laser light with one or more square waves and directly measures the round-trip travel time of the emitted square waves. In other embodiments, other types of distance meters may be used. However, in typical distance meters, contamination in the measurement of a reference distance such as that reflected off the reference reflector 60 is subject to contamination by spurious signals.

In the present example, the spurious signal or light 160 is largest of the spurious signals received by the optical detector 214, but it should appreciated that in some embodiments many other unwanted optical reflections off the reference reflector 60 may follow different optical paths and represent additional spurious signals. For example, some of the spurious signals scatter a first time off the reference reflector 60, travel to the rotary mirror 26, scatter a second time off the reference reflector 60, and then refract through the mirror or collecting lens 35 before arriving at the receiver assembly 200. However, for clarity only spurious or scattered light 160 is illustrated in FIG. 6.

Figure 7A:
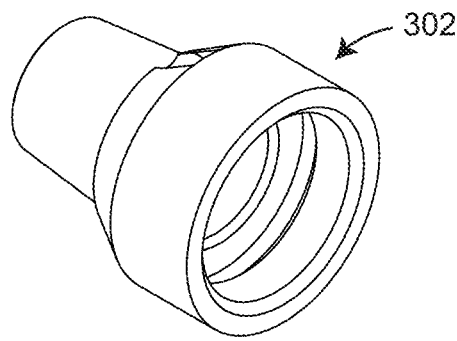
FIGS. 7A, 7B depict isometric and cross-sectional views, respectively, of a 3D aperture according to an embodiment.
Figure 7B:
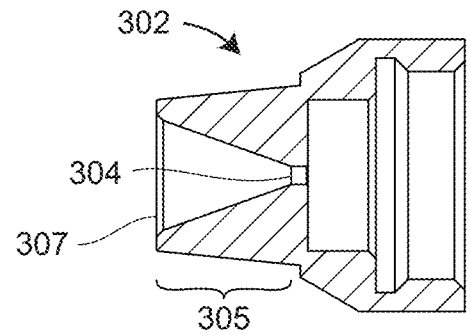
Figure 7C:
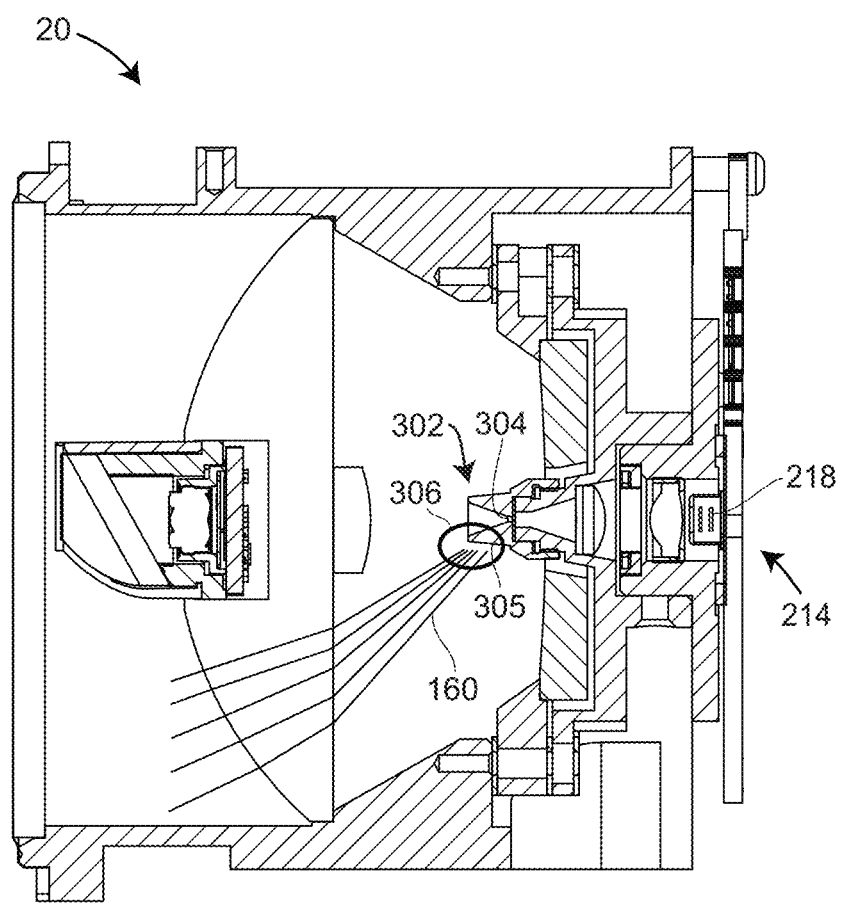
FIG. 7C is a cross-sectional view of a portion of the laser scanner showing the geometry by which the 3D aperture keeps unwanted reference light from reaching the optical detector according to an embodiment.

Embodiments herein further improve the accuracy of the determined reference distance by reducing or minimizing spurious reflections from the reference reflector 60. In an embodiment, a way to do this is to replace the aperture cap 202 with a 3D aperture structure 302. FIGS. 7A, 7B are isometric and cross-sectional views, respectively, of the 3D aperture structure 302. The smallest inner opening of the 3D aperture structure is the aperture 304. The side walls 305 of the 3D aperture structure 302 extend from the front surface 307 of the 3D aperture structure 302 to the front surface of the aperture 304. FIG. 7C is a cross-sectional view of a portion of the scanner 20 onto which the aperture cap 202 has been replaced with the 3D aperture structure 302. As indicated by the oval 306, the side walls 305 of the 3D aperture structure 302 block unwanted scattered light 160 from passing through the aperture 304 to reach the photodetector 218 in the optical detector 214. In an embodiment, the side wall 305 defines a central conical opening having a diameter adjacent the front surface 307 being larger than a diameter adjacent the aperture 304. In an embodiment, the 3D aperture structure 302 is coupled to the second holding structure 206 (FIG. 4) to align the 3D aperture with the optical detector 218.

FIGS. 8A, 8B illustrate a further an issue that may occur in the scanner 20 of FIG. 4. FIG. 8A is a cross-sectional view showing some components of the scanner 20 of FIG. 4. These components include the collecting lens 35, which refracts the returning light 32 reflected off the object 10. The refracted light reflects off the concave mirror 39 and the convex mirror 37 before converging to the small spot 43 and passing on to the receiver assembly 200. FIG. 8A has a highlighted region 240 that includes the optical bandpass filter 210, the focusing lens 212, and the photodiode 218.

FIG. 8B shows an enlarged highlighted region 250 that includes the optical bandpass filter 210, the focusing lens 212, the front surface of the photodiode 218, a virtual reversed focusing lens or element 212R and a virtual reversed filter or element 210R. The returning light 32 passes through the optical bandpass filter 210 and the focusing lens 212 before reaching the front surface of the photodiode 218. If the rays of light come to a focus or focal point 219 on a reflective front surface of the photodiode 218, and if the surfaces 209, 211, 221 are perpendicular to the rays of light, the rays of light will reflect back on themselves, retracing their paths. This is equivalent to tracing the rays through the focal point 219 on the surface 221 and then passing the light onto hypothetical reversed elements 212R and 210R. Here the element 212R is reversed relative to the focusing lens 212, and the element 210R is reversed relative to the optical bandpass filter 210. The length 252 is the length of a fundamental cavity mode for the surfaces 209, 209R. The length 250 constitutes a fundamental cavity mode for the surfaces 211, 211R. Cavity modes may permit multiple reflections to reach the optical detector 218, each reflection potentially causing a change in the distance measured by the receiver assembly 200.

It is often the case that semiconductor materials used in the photodiode 218 have a relatively high index of refraction, for example, an index of refraction of 3.5. For this situation, the reflectance of the front surface of the photosensor back into air is calculated by the Fresnel equations to be $((3.5-1.0)/(3.5+1.0))^2=0.31$, or 31%. This is a relatively large reflection, which means that cavity reflections could be significant. In an embodiment, a first surface 209 of the optical bandpass filter 210 is an anti-reflection (AR) coating that reduces or minimizes back reflections and a long-pass filter coating that reduces or blocks ambient light such as sunlight or room light for example. In an embodiment, the long-pass filter coating further reduces or prevents fluorescent effects from occurring in particles inside the glass of the optical bandpass filter 210. In an embodiment, the second surface 211 includes a thin dielectric coating that blocks wavelengths of light except in a narrow region about the wavelength of emitted laser light, such as 1550 nm for example. This narrow bandpass filter further reduces or blocks ambient light, such as sunlight and room light for example. In other embodiments, the coatings of the surfaces 209, 211 are reversed.

Figure 8D:
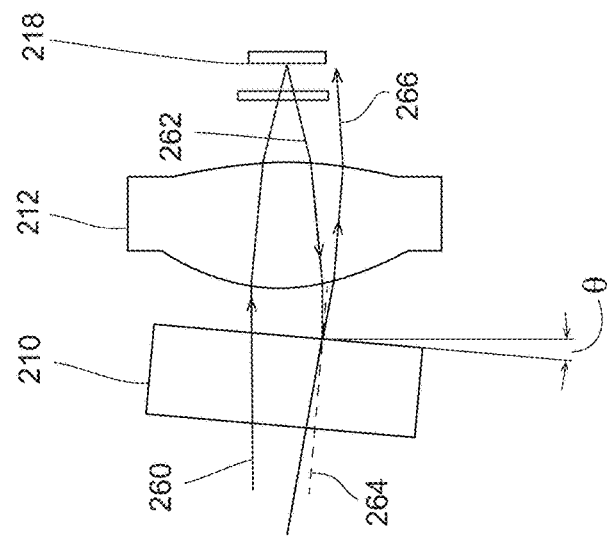
FIGS. 8C, 8D are cross-sectional views of an arrangement in which an optical filter is tilted to eliminate cavity reflections according to an embodiment.
Figure 8C:
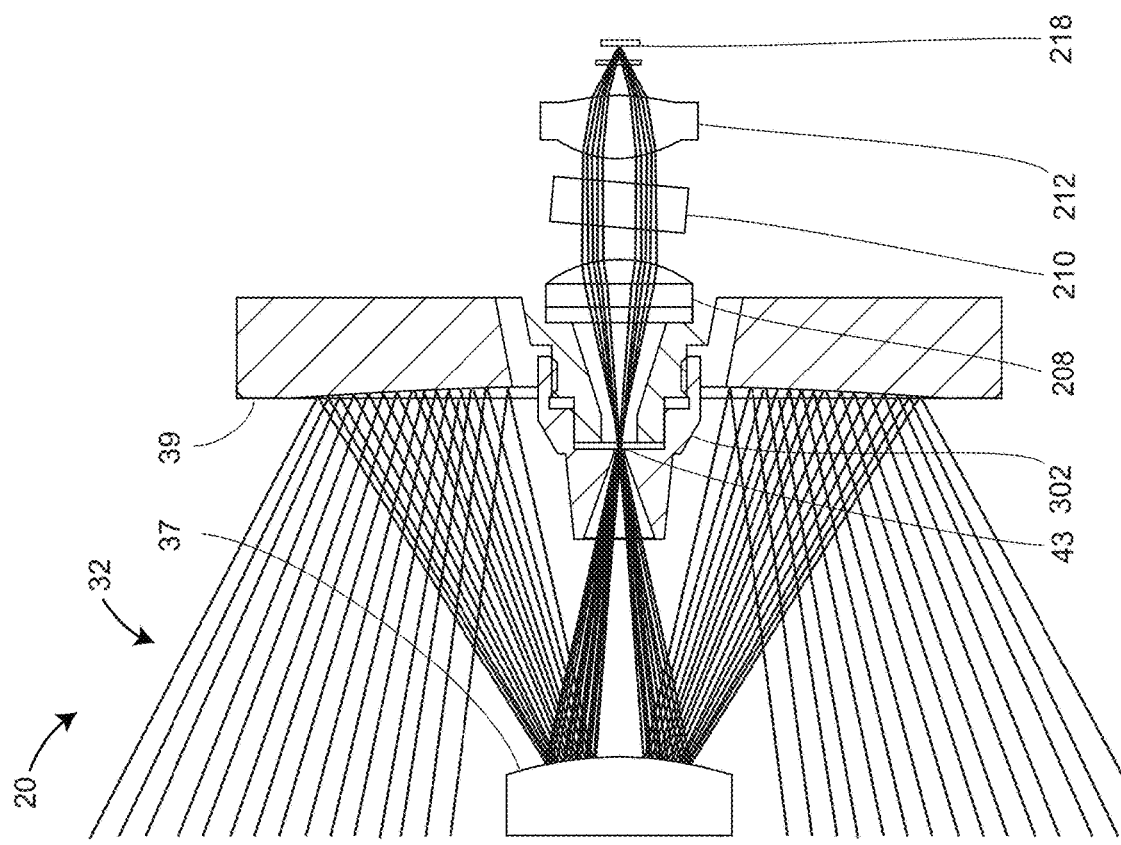

A way around this problem is to tilt the optical bandpass filter 210. FIG. 8C shows a cross-sectional view of a portion of the scanner 20 having the optical bandpass filter 210 tilted at an angle. FIG. 8C further includes the 3D aperture structure 302. FIG. 8D shows an enlarged view of the optical bandpass filter 210, the focusing lens 212 and the photodetector 218. A ray of light 260 intercepts the front surface of the photodetector 218 and is reflected as a ray of light 262. The ray of light passes through the focusing lens 212 and intercepts the optical bandpass filter 210 at an angle of incidence θ, which in the example shown is 5 degrees (relative to a line that is perpendicular to an optical axis of the photodetector 218). The angle of incidence θ is referenced to the normal vector 264, as is the angle of reflection, which is also θ. As shown in FIG. 8D, the reflected light 266 misses the surface of the photodetector 218, thus avoiding the potential error in the distance determined by the receiver assembly 200. In general, the thin film dielectric coating used to provide the passband of the optical bandpass filter 210 depends sensitively on the angle of tilt θ of the optical bandpass filter 210. In an embodiment, the coating of the optical bandpass filter is configured for the specified angle of tilt θ.

Figure 9:
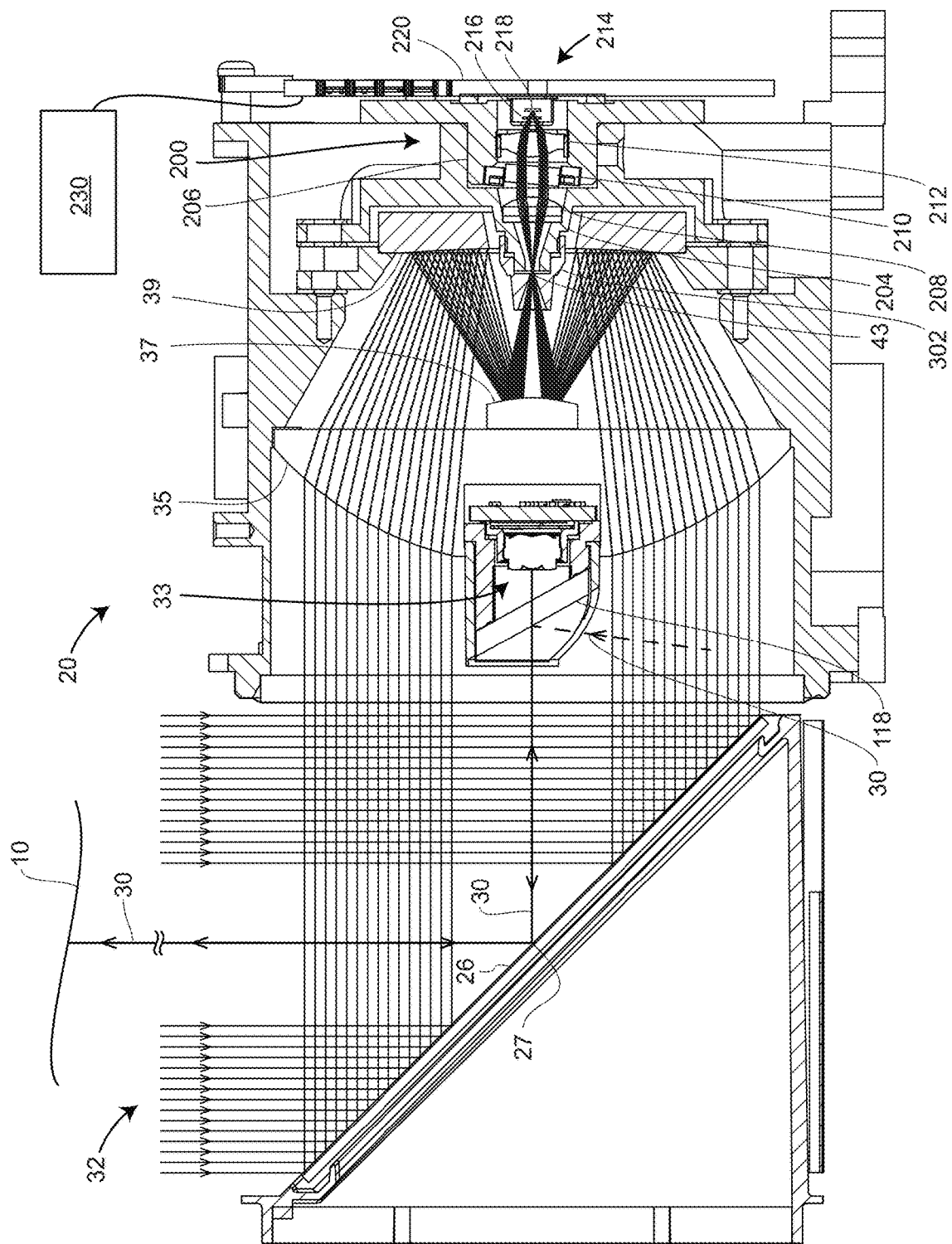
FIG. 9 is a cross-sectional view of a portion of the laser scanner that incorporates the improved 3D aperture and tilted optical filter according to an embodiment.

FIG. 9 is a cross-sectional view of the scanner 20 showing two changes. First, the aperture cap 202 is replaced with the 3D aperture structure 302. Second, the optical bandpass filter 210 is tilted at a large enough angle so that light, which is reflected by the photodetector 218 onto the optical bandpass filter 210, is reflected by the optical bandpass filter 210 at an angle large enough to miss (e.g. not intersect or be received by the active area) the photodetector 218.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A three-dimensional (3D) scanner comprising:
    a light source to send first light onto an object;
    an optical bandpass filter having a tilt angle; and
    an optical detector having an active area, the optical detector receiving a second light, the second light being a portion of the first light reflected off of the object, the optical detector reflecting a third light onto the optical bandpass filter, the third light being a portion of the second light, the optical bandpass filter reflecting a fourth light, the fourth light being a portion of the third light, wherein the tilt angle of the optical bandpass filter reflects the fourth light into an area not in the active area, the tilt angle of the optical bandpass filter is tilted relative to a focusing lens that focuses the second light on to the optical detector.

2. The 3D scanner of claim 1, wherein the optical bandpass filter includes a dielectric coating selected based at least in part on the tilt angle.

3. The 3D scanner of claim 1, wherein the active area includes at least one of a photodiode or a photodetector.

4. The 3D scanner of claim 1, wherein the focusing lens is disposed between the optical bandpass filter and the active area.

5. The 3D scanner of claim 1, wherein the tilt angle is 5 degrees.

6. The 3D scanner of claim 1, further comprising:
    a reference reflector to reflect light from the light source; and
    a 3D aperture structure having a side wall and an aperture, the aperture sized to pass a first portion of the light reflected by the reference reflector, the side wall sized to block a second portion of the light reflected by the reference reflector.

7. The 3D scanner of claim 6, wherein the 3D aperture structure includes a front surface, the side wall extending between from the front surface to a front side of the aperture.

8. The 3D scanner of claim 7, wherein the side wall defines a conically shaped opening between the front surface of the 3D aperture structure and a front side of the aperture.

9. The 3D scanner of claim 8, wherein a diameter of the conically shaped opening adjacent the front surface of the 3D aperture structure is larger than the diameter adjacent the aperture.

10. The 3D scanner of claim 6, wherein the 3D aperture structure is coupled to the optical detector.

* * * * *